United States Patent
Nomaguchi et al.

[15] 3,685,950
[45] Aug. 22, 1972

[54] COMBUSTION APPARATUS FOR MIXING FUEL AND AIR IN DIVIDED PORTIONS

[72] Inventors: Tamotsu Nomaguchi; Norikazu Tobata; Toshio Ito, all of Amagasaki, Japan

[73] Assignee: Mitsubishi Electric Corporation, Tokyo, Japan

[22] Filed: June 19, 1970

[21] Appl. No.: 47,668

[30] Foreign Application Priority Data

June 23, 1969 Japan..................44/49578
July 3, 1969 Japan..................44/52720
Nov. 10, 1969 Japan..................44/89894

[52] U.S. Cl..................................431/285, 431/350
[51] Int. Cl..................................F23d 15/02
[58] Field of Search......431/178, 179, 181, 285, 346, 431/347, 350, 353, 354, 328, 170; 126/91 A, 92 R

[56] References Cited

UNITED STATES PATENTS

| | | |
|---|---|---|
| 1,446,365 | 2/1923 | Wiederhold..................126/92 |
| 2,970,178 | 1/1961 | Braconier et al......23/277 UX |
| 3,076,497 | 2/1963 | Robb..........................431/178 |
| 3,170,504 | 2/1965 | Lanning......................431/328 |
| 755,965 | 3/1904 | Symonds...................431/346 |
| 1,874,488 | 8/1932 | Franklin................431/178 X |
| 3,155,142 | 11/1964 | Stack......................431/346 X |

Primary Examiner—Frederick L. Matteson
Assistant Examiner—Harry B. Ramey
Attorney—Oblon, Fisher & Spivak

[57] ABSTRACT

Apparatus for feeding fuel gas and air portionally into a combustion chamber for obtaining improved fuel-air mixing efficiency in which at least one of the fuel gas and air is forcibly injected into the combustion chamber and including a heat catalyst in the combustion chamber to produce steady and gentle combustion of a high load factor.

7 Claims, 7 Drawing Figures

PATENTED AUG 22 1972

INVENTOR
TAMOTSU NOMAGUCHI
NORIKAZU TABATA
TOSHIO ITO

BY *Ohlon, Fisher and Spivak*

ATTORNEY

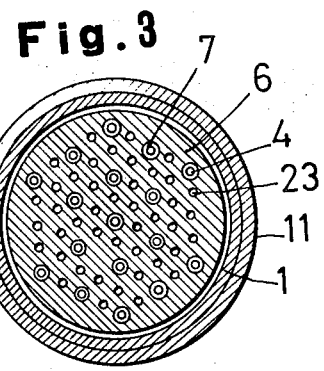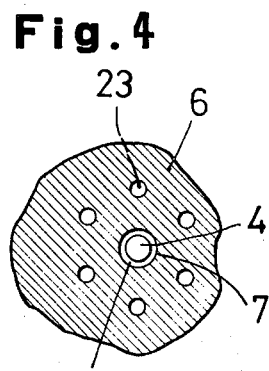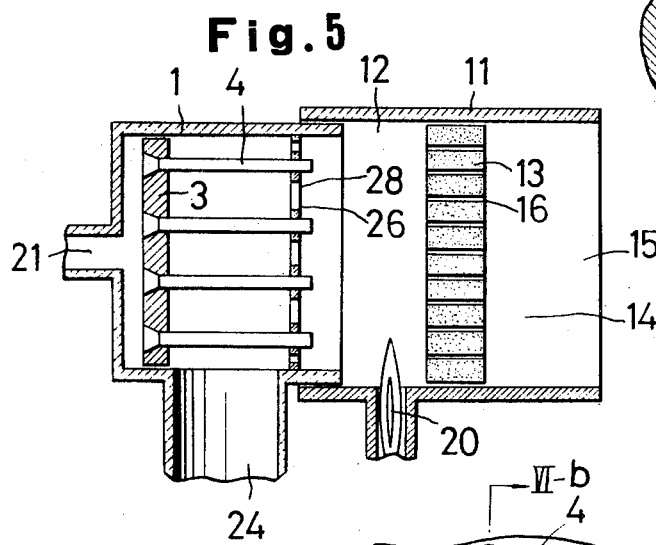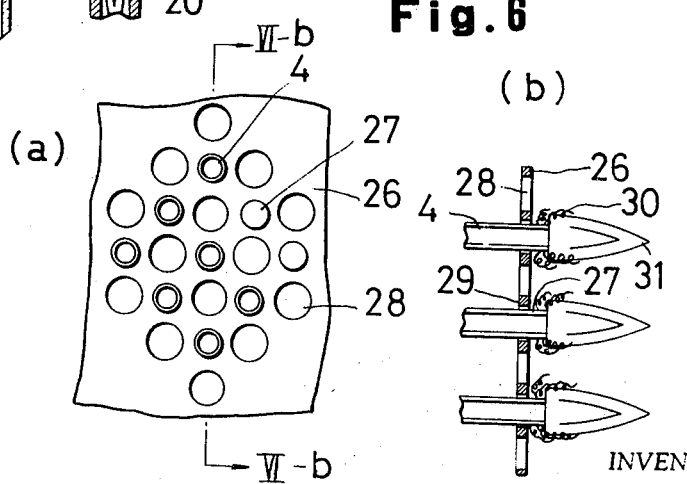

3,685,950

COMBUSTION APPARATUS FOR MIXING FUEL AND AIR IN DIVIDED PORTIONS

BACKGROUND OF THE INVENTION

1. Field of the Invention

This invention relates generally to a combustion apparatus useful for cooking, water-heating, room-heating, and other purposes, and more particularly to an apparatus of the character described in which fuel gas and air are mixed in divided portions in a novel manner so as to enhance fuel-air mixing efficiency.

2. Description of the Prior Art

In conventional combustion apparatus used for cooking, water-heating, room-heating and the like, a substantial part of the air needed for supporting combustion is supplied from the peripheral regions of the burning flames by utilizing the convoluting action of the flames. In this case, however, it is necessary to provide a flue having a comparatively large diameter to discharge the combustion gas to the outside of the room, or of the building. On the other hand, if means are provided for forcibly injecting or sucking the air into the combustion apparatus, it would be possible to complete the combustion in a relatively narrow space and thereby to discharge the combustion gas through a flue of as small a diameter as the pressure head of the air blower means permits. In this case, however, a fluctuation in the fuel-air mixing ratio in the combustion chamber inevitably occurs due to the forced mixing of air and fuel, and this results in an unstable combustion. Also, other factors such as breakdown of the active particles on the combustion chamber walls negate the possibility of narrowing the combustion chamber beyond certain limits.

SUMMARY OF THE INVENTION

The present invention therefore aims at providing an improved combustion apparatus comprising a combustion chamber arranged such that air forcedly introduced from the outside and fuel gas under suitable pressure are injected thereinto by being divided into as many portions as possible so as to enhance the fuel-air mixing efficiency by a resultant ejector effect, and in which, if need be, there is provided a heat catalyst material for producing on its surface a large amount of active molecules effective for execution of chain reactions of combustion, thereby to obtain combustion of extremely high stability and high load factor.

It is also an object of the present invention to provide a combustion apparatus in which combustion is performed with the rate of air-to-fuel gas being approximated to the stoichiometrically determined value, thus allowing a reduction in the amount of air being used and thereby achieving a resultant enhancement of combustion gas temperature to make heat utilization advantageous.

It is another object of the present invention to provide a combustion apparatus in which the mixing of fuel gas and air is conducted in two stages so as to realize a gentle and stable start-up of combustion flames and minimize the combustion noise.

The present invention also has for its object the provision of a combustion apparatus in which the mixing of air and fuel gas is performed in the neighborhood of the combustion chamber so that there is no fear of causing flash-back or backfire, with resultant increased stability of combustion.

It is an additional object of the present invention to provide a combustion apparatus in which mixing of fuel gas and air is achieved by a turbulent type mixing and a laminar flow type mixing so that the primary flames of the turbulent mixing will provide a stable starting point for the secondary flames of the laminar flow mixing, so as to thereby obtain stabilized and quiet combustion.

BRIEF DESCRIPTION OF THE DRAWINGS

These and other objects as well as further attendant features and advantages of the present invention will be more readily appreciated as the same becomes better understood from the following detailed description when considered in conjunction with the accompanying drawings, wherein:

FIG. 3 is a cross-sectional view taken along the line III—III of FIG. 2;

FIG. 4 is a partial enlarged cross-sectional view of the mixing plate shown in FIG. 3;

FIG. 5 is a sectional view of still another embodiment of a combustion apparatus formed according to the present invention;

FIG. 6($a$) is a partial enlarged view of the mixing plate shown in FIG. 5; and, FIG. 6($b$) is a sketch illustrating in section a burning condition of the mixing plate shown in FIG. 6($a$) and taken along the line VI$b$—VI$b$ thereof.

DESCRIPTION OF THE PREFERRED EMBODIMENTS

Figure 1:
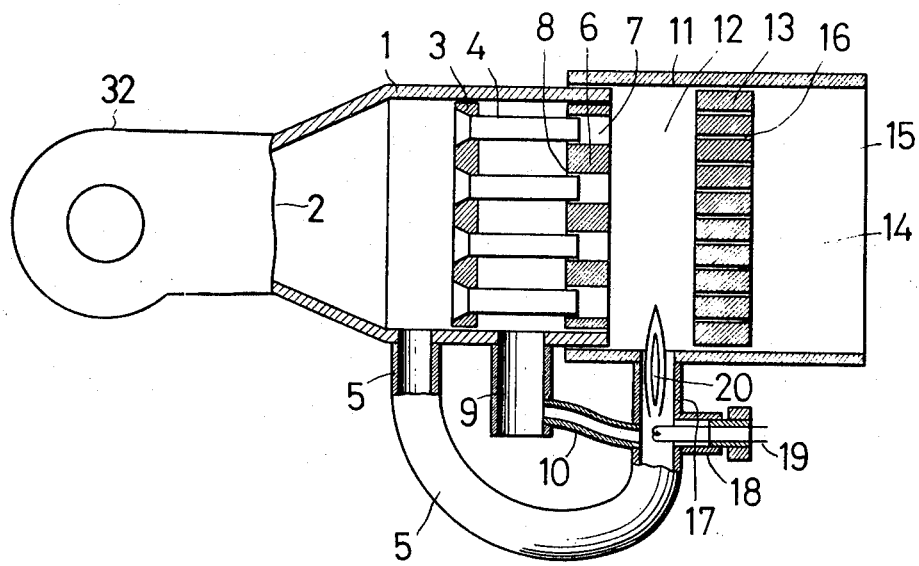
FIG. 1 is a sectional view of one embodiment of a combustion apparatus formed according to the teachings of the present invention.

Referring now to the drawings, wherein like numerals designate like or corresponding parts throughout the several figures, and more particularly to FIG. 1, there is shown a first embodiment of the combustion apparatus constructed according to the teachings of the present invention and having a cylindrical outer shell which is tapered at one end and is preferably made of refractory cast metal, though other materials may also be suitably used. An air blower 32 is connected to a junction 2 for supplying the air needed within the mixing chamber for supporting combustion. An air flow dividing plate 3, which is illustrated as a disc having formed therein a plurality of holes and preferably is made of stainless steel, divides the air flow being fed through the junction 2 and guides it through a plurality of air ducts 4 into the combustion chamber. Each of the air ducts 4 is formed from a cylindrical body fitted in each of the holes in the dividing plate 3, and also is preferably made of stainless steel, for example.

A pipe 5 is provided for delivering a part of the air being fed through the junction 2 into a pilot burner 17. There is also provided a mixing plate 6 having a plurality of through holes 7 corresponding to the air ducts 4. The inner diameter of each hole 7 is slightly larger than the outer diameter of each of the air ducts 4, such that an annular space 8 is formed therebetween. It will be seen that each air duct 4 is positioned in the corresponding hole 7 in such a manner that the outlet of each duct is positioned intermediate the length of its respective hole 7. The mixing plate 6 is a heat-insulating disc which may be made of alumina, zirconia or the like.

Fuel gas, such as, for example, city gas or LP gas, is supplied from an inlet port 9. A pipe 10 serves as a passage for delivering a part of gas from the gas inlet port 9 into the pilot burner 17. The outer shell 11 of the combustion chamber is a cylindrical body, which is made, for example, of a refractory casting, and is adapted to receive an end part of the shell 1 of the mixing chamber, and has provided therein an antechamber 12, a heat catalyst 13, a space 14 where chain reactions of combustion are completed, and an opening 15 through which the combustion chamber may be connected to a flue for exhausting the combustion gas, or to a suitable heat exchanger. The heat catalyst 13 is a disc having a plurality of slits 16 and is made of a porous high-purity metal oxide such as, for example, about 98 percent by weight alumina ($Al_2O_3$), zirconia, magnesia, or the like.

The pilot burner 17 comprises an igniter mounting block 18, an igniter means 19, such as an ignition heater shown in the illustrated embodiment, and a burner 20 for igniting and burning the fuel mixture to produce pilot flames in the antechamber 12.

In the operation of the combustion chamber shown in FIG. 1, the air is fed in through the junction 2 from the blower 32 and passes partly through the air ducts 4 provided in the air flow divider plate 3 and partly through the pipe 5 from which it is directed to the antechamber 12 and the pilot burner 17, respectively. At the same time, fuel gas being supplied from the inlet port 9 passes partly through the mixing plate 6 into the antechamber 12 and partly through the pipe 10 into the pilot burner 17. The mixture gas in the pilot burner 17 is ignited upon application of a suitable electric current to the ignition heater 19, and the resultant pilot flames extend into the antechamber 12 to ignite the mixture gas therein. Combustion in the antechamber 12 invites rapid heating of the heat catalyst 13, and full-scale combustion is initiated in the inner surfaces of the slits 16 formed in the heat catalyst 13 approximately ten seconds after ignition, thereby providing an almost flameless combustion. Accordingly, only a small space 14 is required for the slip stream of the heat catalyst 13, and a heat exchanger or a flue can be immediately fitted in a desired manner suited for best utilization of heat. The heat catalyst 13, being made of a refractory heat insulator such as alumina, functions to produce on its surface, at high efficiency, the active molecules useful in chain reactions of combustion in a hot atmosphere. Combustion in the slits 16, therefore, proceeds smoothly and promptly, causing additional rise of temperature of the heat catalyst 13 and thereby increasing its catalytic effect.

In an experiment, surface temperature of the heat catalyst 13 reached the level of 1,400°C. Since the antechamber 12 and the space 14 are also heated to a high temperature owing to the radiation of heat from the heat catalyst 13, the ignition heater 19 is arranged to ignite only the pilot burner 17. Thus, the ignition heater 19 is not directly exposed to the elevated temperatures generally present in the combustion chamber and can therefore well stand long usage.

The effect of the mixing plate 6 will be understood more clearly from the following detailed explanation given in this connection. Fuel gas is forcibly ejected through the annular spaces 8 formed between the air ducts 4 and the holes 7, while air stream simultaneously being fed from the air blower is divided by the divider plate 3 and ejected through the air ducts 4. The "ejector effect" produced by the forcible ejection of air into the holes 7 in the mixing plate 6 provides extremely efficient admixture of air and fuel gas. In the event, alternatively, where fuel gas, rather than air, were forcibly injected into the holes 7, a similar ejector effect developed by such fuel gas would also produce excellent admixture of air and fuel gas. As a result, flames start up smoothly from the neighborhood of the inner faces of the holes 7. The mixing plate 6 may be made of the same material as the heat catalyst 13, but metal may also be used to obtain similar stability of combustion. Both the air ducts 4 and mixing plate 6 are kept at a relatively low temperature since they are constantly cooled with pre-combustion gases.

In the experimental embodiment, both the dividing plate 3 and the mixing plate 6 had a diameter of 50 mm., and the air ducts 4 were prepared by using 37 pieces of steel pipes, each having a length of 15 mm. and an outer diameter of 5 mm. The mixing plate 6 was perforated to form the holes 7 with diameters of 6 mm. and a 10 mm.-thick heat catalyzer plate 13 having 85 holes of 3 mm. diameter each was positioned 20 mm. behind the mixing plate 6, whereby it was possible to produce combustion of up to 6,000 Kcal/hr with less than 10 $H_2O$ mm. pressure drop between the junction 2 and the opening 15. The combustion load factor reached approximately ten times as high as that in the conventional combustion apparatus heretofore available.

The arrangement and configuration of the component parts are not restricted to the above embodiment. It is also possible according to the present invention, for example, to promptly achieve perfect combustion at a fuel-air mixing rate close to the theoretical value, thus permitting a more compact structure of the combustion apparatus. In other words, in this embodiment where the arrangement is made such that the air necessary for combustion is fed by a small-sized air blower, the tube diameter and the hole diameter are suitably selected in correspondence to the pressure head of the blower means. It will be understood that a higher pressure head of the blower means allows higher compactness of the combustion chamber.

Figure 2:
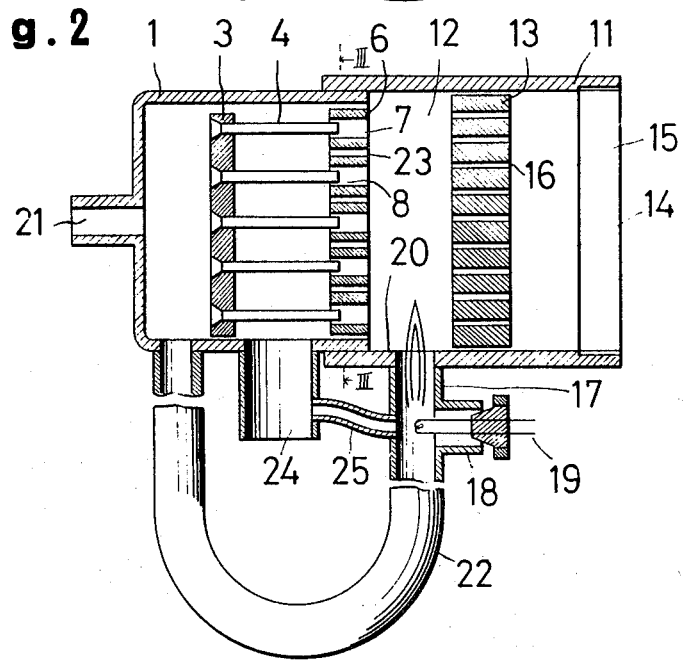
FIG. 2 is a sectional view of another embodiment of a combustion apparatus constructed in accordance with the teachings of this invention.

Another embodiment of the combustion apparatus constructed according to the present invention is shown in FIGS. 2,3, and 4. In this embodiment, the outer cylindrical shell 1 of the mixing chamber is provided with a fuel gas inlet port 21 in one end thereof and a pipe 22 opening into the side wall of the shell adjacent the port 21 for connecting the inlet port 21 with a distant pilot burner 17 so as to deliver a part of the fuel being fed into the mixing chamber from the inlet port 21 to the pilot burner 17. In addition to the holes 7 in the mixing plate 6, which are similar to those in FIG. 1 and slightly larger than the outer diameter of the ducts 4, the mixing plate 6 also has a plurality of smaller air holes 23 arranged therein to surround the holes 7 in a manner illustrated in FIGS. 3 and 4. There is also provided in the side wall of the shell 1 between the fuel gas flow divider plate 3 and the mixing plate 6, and air feeding port 24 through which air is injected by an air blower (not shown). Connected between the air feeding port 24 and the pilot burner 17 is a pipe 25 adapted to deliver a part of the air from the feeding port 24 into the pilot burner 17.

The particular differences of the combustion apparatus in FIGS. 2 to 4 from that shown in FIG. 1 reside in the varied arrangement of the fuel gas inlet port and the air feeding port and in the formation of additional air holes 23 arranged to surround the holes 7 in the mixing plate 6.

The primary function of the mixing plate 6 shown in FIG. 2 is to eject a part of the air introduced from the air feeding port 24 from the annular spaces 8 and to mix this air with fuel gas being discharged through the ducts 4 by the so-called ejector effect. The remaining portion of air is passed through the air holes 23 into the antechamber 12 where it is further mixed with the fuel gas and air mixture. It will thus be understood that although air and fuel are not perfectly stoichiometrically mixed in the through holes 7, sufficient stoichiometric mixing is effected in the antechamber 12 with air being supplied from the air holes 23. When ignited by the pilot burner 17, the mixture in the antechamber 12 begins to burn slowly from the inner surfaces of the holes 7 near the outlets of the ducts 4. The mixture in the holes 7 is slightly short of air, but such condition proves rather helpful to produce a quiet start-up of flames and to minimize the noises usually created in the combustion chamber. Long-time continuance of such condition of air shortage generally involves a possibility of causing sedimentation of carbons, but according to the present invention, due to the facts that the mixing plate 6 has a thickness of about 10 mm. at most and that sufficient air is given to the mixture upon entering the antechamber 12, such undesirable sedimentation of freed carbons does not take place either inside the holes 7 or in the antechamber 12.

In this manner, fuel gas being supplied is divided into several portions by the divider plate 3 and the ducts 4 connected at one end to the divider plate 3 are so disposed that their outlets are positioned substantially midway along the length of the respective holes 7 formed in the mixing plate 6 which have larger diameters than those of the ducts 4, whereby air is ejected from the annular spaces 8 between the ducts 4 and the holes 7 to thereby achieve preliminary mixing of fuel and air by virtue of the resultant ejector effect, so that it is possible to start combustion inside the holes 7 provided in the mixing plate 6 and to thereby produce quiet combustion. Thus, unlike in the conventional devices, the air supply to the preliminarily mixed gaseous bodies in the antechamber 12 to attain stoichiometrical mixing is only of such quantity as is necessary, so that the mechanism of the apparatus can be formed compactly.

As discussed above, since fuel-air mixing is conducted in two steps, the initiation of flame is smooth and gentle and, also, burning flames are stable and make little noise, thus realizing almost soundless combustion. Further, since mixing of air and fuel is performed in close vicinity to the combustion chamber, any possibility of flash-back or backfire is eliminated to assure the increased stability of combustion.

Turning now to FIGS. 5 and 6, where another embodiment of the combustion apparatus formed according to the present invention is shown, the construction of the mixing plate per se and the positional relationship between the mixing plate and the air ducts will be seen to be the main differences from the embodiments shown in FIGS. 1 to 4. The mixing plate 26 is a stainless steel disc having a thickness of several millimeters and is formed with a plurality of through holes 27 and a plurality of air holes 28 arranged suitably in surrounding relation with the holes 27. In each of the holes 27, a duct 4 is inserted in such a manner that the latter protrudes from the antechamber side of the mixing plate 26 by a length substantially equal to its diameter, as best shown in FIG. 6(b). In this case, the annular spaces 29 formed between the outer diameter of the ducts 4 and the inner diameter of the holes 27 have no direct relation to the operation and are simply so designed only for the purpose of facilitating the ready insertion of the ducts 4 into the holes 27.

The embodiment shown in FIGS. 5 and 6, like those previously described, however, also is arranged for producing a gentle and stabilized flame start-up and to minimize the noises normally caused by combustion. The structural arrangement characteristics of this embodiment and the resultant effects will be discussed hereinbelow. In FIG. 6, the reference number 30 indicates the primary flames produced by turbulent mixture of air and fuel, and 31 the secondary flames produced by laminar flow type mixture of air and fuel. As mentioned before, the ends of the ducts 4 extend beyond the mixing plate 26 by a length substantially equal to the diameter thereof and a plurality of air holes 28 are formed in the mixing plate in a slightly spaced and surrounding relation with these ducts 4, as shown best in FIG. 6(a).

The primary flames 30 are produced in the following manner: when passing through the air holes 28, air is partly turned into a turbulent flow, and this turbulent air flow, along with a part of the fuel being discharged from the ducts 4, is trapped in a pocket of negative pressure produced at the juncture between the ducts 4 and the mixing plate 26, whereby they become mixed in a turbulent manner. The secondary flames 31, on the other hand, are produced by a gentle laminar flow type mixing of the air and fuel, and their starting point is stabilized by the primary flames. Thus, in effect, stabilized flames are produced around the protruded portions of the ducts 4 beyond the mixing plate 26, with these protruding portions acting like wicks. As will be understood from the foregoing explanation, the positional relationship between the ducts 4 and the air holes 28 is such that turbulent mixing of air and fuel gas is caused at the juncture of the ducts 4 and the mixing plate 26 to give rise to the primary flames 30 which provide a stabilized starting point for the secondary flames 31.

In the combustion apparatus shown in FIGS. 1 and 5, the desired combustion can be obtained if suitable modifications are made in the fuel gas feeding port and the air feeding port. In this case, air and fuel gas pressures are, in practice, selected in the following manner. In case of using city gas or LP gas as fuel gas, pressure of such city gas or LP gas, which usually ranges between about 20 $H_2O$ mm. to several hundred $H_2O$ mm., is suitably reduced to a level where the fuel gas will have a pressure of less than 20 $H_2O$ mm., while the pressure of the air being supplied from an air blower or the like is adjusted to a level within the range of about 20 H$_2$O mm. to about 100 H$_2$O mm.

For applying the fuel gas and air at suitable pressures, the following methods are recommendable: in the case of fuel gas, one may either use city gas or LP gas which is reduced in pressure in the manner described above, or, if desired, a compressor may be utilized. For the air, one may obtain the desired pressure level by using an air blower, such as mentioned above, or, if need be, may use a compressor.

It is also possible to arrange the apparatus such that the fuel gas and air are sucked in by an air blower disposed downstream of the flow path in the combustion chamber.

Obviously, many modifications and variations of the present invention are possible in light of these teachings. It is to be understood, therefore, that within the scope of the appended claims, the invention may be practiced otherwise than as specifically described herein.

What is claimed and desired to be secured by Letters Patent is:

1. A combustion apparatus in which fuel gas and air are mixed in divided portions, comprising:
    a cylindrical mixing chamber shell;
    a cylindrical combustion chamber shell disposed adjacent to said mixing chamber shell;
    a flow-dividing plate in said mixing chamber shell having a plurality of holes therethrough;
    a plurality of ducts, each having one end connected to a corresponding one of said plurality of holes formed in said dividing plate;
    a mixing plate having a first plurality of through holes, each having a diameter slightly larger than the outer diameter of a corresponding one of said plurality of ducts for receiving therein the other ends of said ducts, and an additional plurality of air holes spaced from and surrounding each of said first plurality of through holes;
    a first inlet positioned in said mixing chamber shell on the side of said flow-dividing plate away from said mixing plate for admitting one of air and fuel gas into said mixing chamber shell;
    a second inlet positioned in said mixing chamber shell between said flow-dividing plate and said mixing plate for admitting the other of said air and fuel gas into said mixing chamber shell;
    means for supplying said fuel gas and air, respectively, under preselected pressures;
    a heat catalyst member having a plurality of through openings positioned in said combustion chamber shell on the side of said mixing plate opposite said flow-dividing plate and spaced therefrom to provide an antechamber in said combustion shell between said mixing plate and said heat catalyst member; and
    a pilot burner for igniting the mixture of air and fuel gas in said antechamber,
    wherein excellent admixture of air and fuel gas is achieved by an ejector effect produced by at least one of the air and fuel gas flows ejected from said ducts and from the annular spaces defined between said ducts and said first plurality of holes of larger diameter in said mixing plate, and said mixture of said air and fuel gas is ignited in said antechamber to rapidly heat said heat catalyst member for initiating a full-scale quiet combustion in said through openings of said heat catalyst member.

2. A combustion apparatus according to claim 1, wherein said ducts are disposed in the first plurality of holes in said mixing plate such that the outlet of each of said ducts is positioned substantially midway along the length of the respective one of said holes.

3. A combustion apparatus according to claim 1, in which said heat catalyst member is made of a porous metal oxide.

4. A combustion apparatus according to claim 1, in which said ducts inserted in their respective holes in said mixing plate are disposed therein such that the outlet ends of said ducts extend through and beyond said holes therein into said antechamber.

5. A combustion apparatus for mixing fuel gas and air in divided portions, comprising:
    a cylindrical mixing chamber shell,
    a cylindrical combustion chamber shell adapted for receiving one end of said mixing chamber shell,
    a flow-dividing plate having a plurality of holes disposed in said mixing chamber shell,
    a plurality of ducts each having one end connected to a corresponding one of said plurality of holes in said flow-dividing plate,
    a heat catalyst member having a plurality of apertures being positioned in said combustion chamber shell downstream of said flow-dividing plate to provide an antechamber in said combustion chamber shell for containing the mixture of air and fuel gas during preliminary burning thereof,
    a mixing plate between said flow-dividing plate and said heat catalyst member having a first plurality of holes therethrough arranged such that the outlet ends of said ducts extend through and beyond said holes therein into said antechamber, and a second plurality of holes formed therein spaced from and surrounding each of the outlets of said plurality of ducts,
    a first feeding port for admitting one of air or fuel gas, said port being located at a position in said mixing chamber shell which is upstream of said flow-dividing plate,
    a second feeding port for admitting the other of said fuel gas or air, said second feeding port being located at a position in said mixing chamber shell which is between said flow-dividing plate and said mixing plate,
    means for supplying said fuel gas and air at suitable pressure, and,
    a pilot burner for igniting the mixture in said antechamber.

6. A combustion apparatus according to claim 5, in which the outlet ends of said ducts protrude from said mixing plate by a length substantially equal to the outer diameter of the outlet of said duct.

7. A combustion apparatus in which fuel gas and air are mixed in divided portions, comprising:
    a cylindrical mixing chamber shell;
    a cylindrical combustion chamber shell disposed adjacent to said mixing chamber shell;
    a flow-dividing plate in said mixing chamber shell having a plurality of holes therethrough;

a plurality of ducts, each having one end connected to a corresponding one of said plurality of holes formed in said dividing plate;

a mixing plate having a plurality of through holes, each having a diameter slightly larger than the outer diameter of a corresponding one of said plurality of ducts for receiving therein the other ends of said ducts;

a first inlet positioned in said mixing chamber shell on the side of said flow-dividing plate away from said mixing plate for admitting one of air and fuel gas into said mixing chamber shell;

a second inlet positioned in said mixing chamber shell between said flow-dividing plate and said mixing plate for admitting the other of said air and fuel gas into said mixing chamber shell;

means for supplying said fuel gas and air, respectively, under preselected pressures;

a heat catalyst member having a plurality of through openings positioned in said combustion chamber shell on the side of said mixing plate opposite said flow-dividing plate and spaced therefrom to provide an antechamber in said combustion chamber shell between said mixing plate and said heat catalyst member;

a pilot burner for igniting the mixture of air and fuel gas in said antechamber;

first conduit means connecting said antechamber and said mixing chamber shell between the first inlet and the flow-dividing plate therein;

second conduit means connecting said second inlet and said first conduit means, wherein in said pilot burner is positioned in said first conduit means and excellent admixture of air and fuel gas is achieved by an ejector effect produced by at least one of the air and fuel gas flows ejected from said ducts and from the annular spaces defined between said ducts and said holes of larger diameter in said mixing plate, and said mixture of air and fuel gas is ignited in said antechamber to rapidly heat said heat catalyst member for initiating a full-scale quiet combustion in said through openings of said heat catalyst member.

* * * * *